Sept. 18, 1928.

M. TOCCHIO 1,684,811

KETTLE AND THE LIKE

Filed Dec. 28, 1927

Witnesses:

Inventor
Michele Tocchio.
Per:
William C. T. Begly
Attorney.

Patented Sept. 18, 1928.

1,684,811

UNITED STATES PATENT OFFICE.

MICHELE TOCCHIO, OF HAMMERSMITH, LONDON, ENGLAND.

KETTLE AND THE LIKE.

Application filed December 28, 1927, Serial No. 243,186, and in Great Britain January 4, 1927.

This invention relates to new and useful improvements in kettles and the like, and has for one of its objects to provide a kettle whereby either side can be heated, and if preferred may be of the kind in which a saucepan, frying pan and the like can be placed thereon and heated simultaneously by means of one heating element.

A kettle according to my invention comprises a receptacle with a reversible spout, a reversible handle, and means for providing an air vent so that when the receptacle is filled with liquid air will escape freely therefrom, whereby either side of said receptacle can be used as the heating surface, and if preferred the receptacle may be formed with a central flue so that a second receptacle can be placed upon the receptacle and heated simultaneously.

Figure 1:
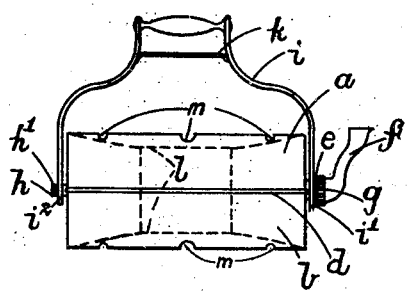
Figure 2:
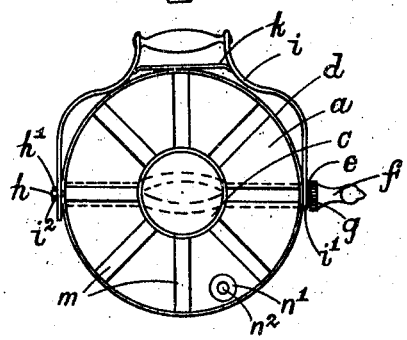
Figure 3:
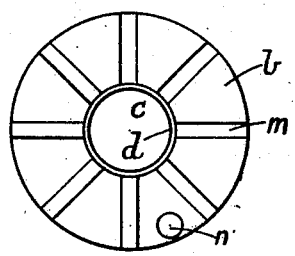
Figure 4:
Figure 5:
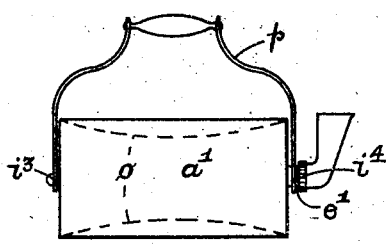
Figure 6:
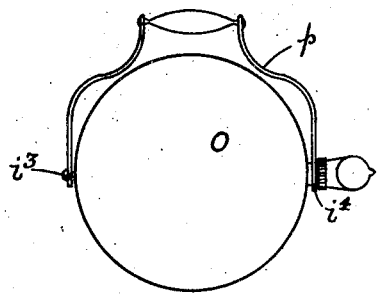

In the accompanying drawings Fig. 1 is a side elevation of one form of the kettle; Fig. 2 is a plan view of Fig. 1; Fig. 3 is a plan of the base of the kettle; Fig. 4 is a detail of the handle; Fig. 5 is a side elevation of a modified form of kettle and Fig. 6 is a plan of Fig. 5.

Referring to Figs. 1 to 4 the kettle is constructed from two bowl shaped receptacles $a$ and $b$ each of which is provided with a central depression and aperture $c$ therein, being secured together at $d^1$ on the periphery and at $d$, around the central depression, whereby said aperture $c$ serves as a flue for the purpose as herein set forth.

The kettle has a threaded lug $e$ adapted to receive a reversible and removable spout $f$, which also serves as a filler, which in turn is secured thereto by means of a union nut $g$, whereby a water tight joint is obtained, and the spout $f$ is easily adjustable.

Diametrically opposite the lug $e$, is a stop $h$, secured to the periphery of the kettle, and said lug $e$, and stop $h$, support a reversible handle $i$, by means of one end $i^1$ of said handle $i$ being pivoted to the lug $e$, and the opposite end $i^2$, formed with a keyway $j$ preferably of the configuration as shown in Fig. 4, adapted to engage with the stop $h$, and is prevented from becoming detached from the stop $h$ by means of a pin $h^1$.

The aforesaid handle $i$ is provided with a guard $k$ arranged immediately beneath the part that is held in the hand, so that when the handle is in a vertical position the guard will prevent same from getting too hot, or a person from burning his hand owing to the hot gases passing through the flue. Normally said handle $i$ is in a rotatable position, but when the same is raised to a vertical position as shown in Fig. 1 or Fig. 2 in dotted lines, the stop $h$ engages with the lower part of the keyway $j$, which said part is of a corresponding shape to the lug whereby the handle $i$ is in a stationary position, and the handle $i$ can again be made rotatable, by merely depressing same so as to cause the end $i^2$ of said handle to move downwards when the stop $h$ will engage with the upper end of said keyway $j$.

The respective ends of the kettle are preferably concave as shewn at $l$ Fig. 1, in dotted lines and are each provided with a plurality of radially disposed grooves $m$ and in the base of said kettle is fitted a removable screw plug $n$, and in the upper end a removable screw plug $n^1$ with an air vent $n^2$, so as to allow the escape of air when the kettle is being filled with water through the spout $f$.

From the foregoing description it will be readily seen that when it is desired to reverse the kettle so as to use the previous upper end as the heating surface, it is only necessary to change over the removable plugs $n$ and $n^1$, unscrew the union nut $g$, when the spout $f$ is reversed, and again secured in position by means of the union nut $g$ when the kettle is ready for use.

In Figs. 5 and 6 I shew a modification of my invention, wherein the kettle $a^1$ has no central flue or radially disposed grooves, but a concave covering $o$ at the respective ends, and the handle $p$ is pivoted at $i^3$ to the periphery of the kettle and to the lug $e^1$ at $i^4$.

The kettle as shewn in Figs. 5 and 6 is also reversible so that either end $o$ can be used as the heating surface, and if desired the handle secured thereto may be arranged in substantially the same manner as herein set forth with reference to Figs. 1 to 4.

By my improved kettle, it will readily be seen that either end can be used for the heating surface, by merely reversing the handle, spout and removable plugs, so that when one end commences to leak owing to same becoming gradually burnt away, it is only necessary to reverse the component parts, when the opposite surface can be used for heating purpose, thus doubling its life to that of an ordinary kettle hitherto used.

The component parts of the kettle may be varied without departing from the invention, for example there may be only one plug adapted to form the air vent, being fitted to the surface which is not used as the heating surface until the opposite one has become burnt away and commences to leak, when said leak on reversing the kettle will serve as the air vent, and the air vent previously used may be closed by a grub screw or the like, furthermore the configuration of the handle and the means of securing the same to the kettle may be varied and may be of a removable type and the shape of the spout and the means of securing same to the kettle may also be varied.

I claim:

1. A kettle comprising a receptacle, two distinct heating surfaces provided thereon, means for securing a reversible spout to said receptacle, means for connecting a reversible handle, means for providing an air vent, and means for reversing said receptacle.

2. A kettle comprising a receptacle, two oppositely disposed heating surfaces provided thereon, a lug secured to said receptacle, a reversible spout, a union, said reversible spout secured to said lug by the union, means for connecting a reversible handle in a rotatable and stationary position, means for providing an air vent, and means for reversing said receptacle.

3. A kettle comprising a receptacle, two oppositely disposed heating surfaces provided thereon, a lug secured to said receptacle, a reversible spout, a union, said reversible spout secured to said lug by the union, a reversible handle pivotally connected to said receptacle, means for providing an air vent in said heating surfaces, and means for reversing said receptacle.

4. A kettle comprising a receptacle, two oppositely disposed heating surfaces provided thereon, a lug secured to said receptacle, a reversible spout, a union, said reversible spout secured to said lug by the union, a stop integral with said kettle diametrically opposite said lug, a reversible handle, one end of said handle pivotally mounted on said lug, a keyway formed at the opposite end of said handle engaging with the stop and means for providing an air vent in said heating surfaces.

5. A kettle comprising a receptacle, two oppositely disposed heating surfaces provided thereon, a central flue in said receptacle, a lug secured on the periphery of the receptacle, a reversible spout, a union, said reversible spout secured to the lug by said union, a stop integral with said kettle, diametrically opposite said lug, a reversible handle, a guard secured thereto, one end of said handle pivotally mounted on said lug, a keyway formed at the opposite end of said handle engaging with the stop and means for providing an air vent in said heating surfaces.

6. A kettle comprising a receptacle, two oppositely disposed heating surfaces, radially disposed grooves formed in each heating surface, flues in said receptacle, a lug secured on the periphery of said receptacle, a reversible spout, a union, said reversible spout secured to the lug by said union, a stop integral with said kettle diametrically opposite said lug, a reversible handle, a guard secured thereto, one end of said handle pivotally mounted on said lug, a keyway formed at the opposite end of said handle engaging with the stop and means for providing an air vent in said heating surfaces.

7. A kettle comprising a receptacle, two oppositely disposed heating surfaces, radially disposed grooves formed in each heating surface, a central flue in said receptacle, a lug secured on the periphery on said receptacle, a reversible funnel shaped spout, a union, said spout secured to the lug by said union, a rectangular shaped stop integral with said kettle diametrically opposite said lug, a reversible handle, a guard secured thereto beneath the horizontal part, one end of said handle pivotally mounted on said lug, a keyway formed near the opposite end of the handle through which passes the stop, the lower part of said keyway engaging with said stop locking the handle in a vertical position, a pin attached to said stop retaining the keyway end of the handle on the stop, a removable screw plug fitted in the respective ends of said receptacle and an air vent formed in one of said removable lugs.

In testimony whereof I have signed my name to this specification.

MICHELE TOCCHIO.